United States Patent [19]

Rossman et al.

[11] Patent Number: 5,739,468

[45] Date of Patent: Apr. 14, 1998

[54] CABLE HANGER

[75] Inventors: John A. Rossman, Lakewood; Jayant D. Patel, Lake Forest, both of Calif.

[73] Assignee: McDonnell Douglas Corporation, Huntington Beach, Calif.

[21] Appl. No.: 703,362

[22] Filed: Aug. 26, 1996

[51] Int. Cl.[6] .................................................. F16L 5/00
[52] U.S. Cl. .......................... 174/65 G; 174/153 G; 248/56
[58] Field of Search .................. 174/65 G, 152 G, 174/153 G, 151, 65 R; 248/56; 16/2.1, 2.2

[56] References Cited

U.S. PATENT DOCUMENTS

| | | | |
|---|---|---|---|
| 1,809,864 | 6/1931 | Pearson | 174/152 G |
| 2,744,769 | 5/1956 | Roeder et al. | 248/56 X |
| 2,807,850 | 10/1957 | Davidson | 16/2.1 X |
| 2,813,692 | 11/1957 | Bremer et al. | 248/56 |
| 2,897,533 | 8/1959 | Bull et al. | 16/2.1 |
| 3,011,745 | 12/1961 | Reid | 248/56 |
| 3,092,361 | 6/1963 | Cook | 248/56 |
| 3,162,412 | 12/1964 | McEntire | 248/56 |
| 3,244,802 | 4/1966 | Sturtevant et al. | 16/2.2 X |
| 3,372,441 | 3/1968 | Fisher | 174/153 G X |
| 3,632,069 | 1/1972 | Thayer | 248/56 |
| 3,889,909 | 6/1975 | Koscik | 248/56 |
| 4,289,288 | 9/1981 | Gransberry et al. | 248/56 |
| 4,457,516 | 7/1984 | Herman et al. | 277/12 |
| 5,353,472 | 10/1994 | Benda et al. | 16/2 |
| 5,406,032 | 4/1995 | Clayton et al. | 174/151 |
| 5,627,342 | 5/1997 | Kramer | 174/65 G |

Primary Examiner—Kristine L. Kincaid
Assistant Examiner—Dean A. Reichard
Attorney, Agent, or Firm—The Bell Seltzer Intellectual Property Law Group of Alston & Bird LLP

[57] ABSTRACT

A fully formed, single piece cable hanger that includes a tube section having a flange at one end of the cylindrical tube section, a plurality of radially extending retaining bumps disposed about the periphery of the tube section at a first predetermined axial distance from the flange, and a plurality of apertures formed in the tube section at a second predetermined axial distance from the flange, the second predetermined axial distance being greater than the first predetermined axial distance.

8 Claims, 2 Drawing Sheets

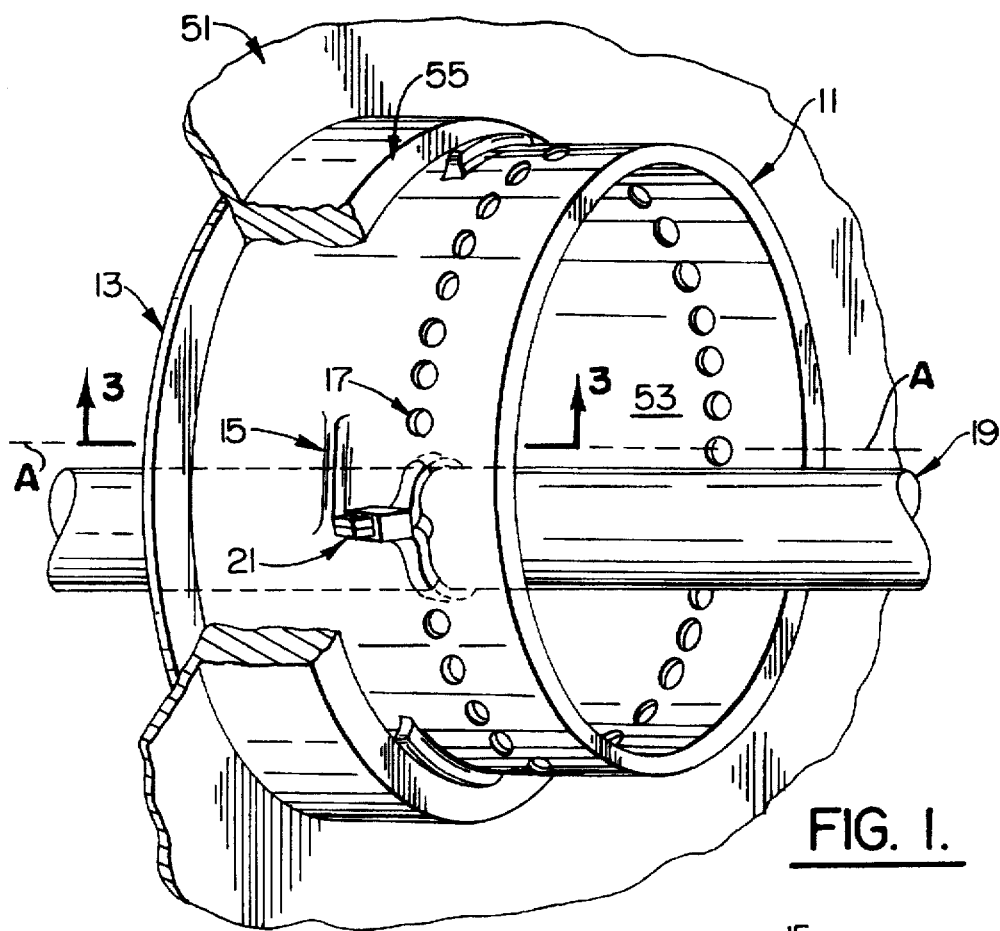
FIG. 1.
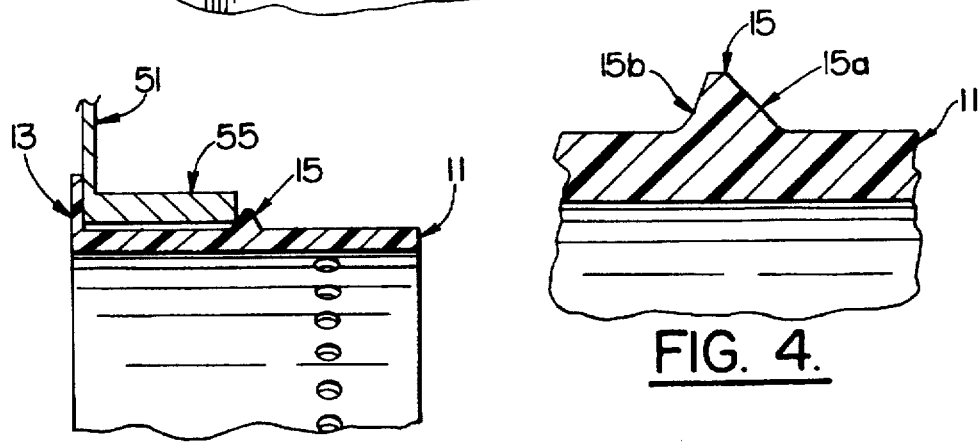
FIG. 3.
FIG. 4.
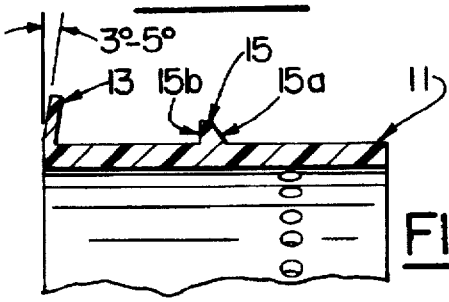
FIG. 5.
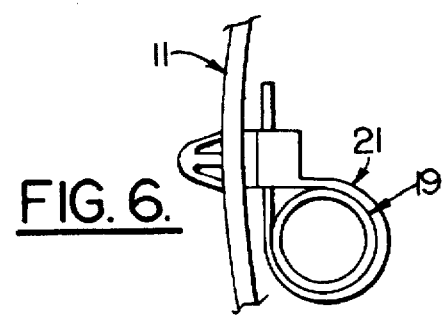
FIG. 6.

CABLE HANGER

BACKGROUND OF THE INVENTION

The disclosed invention generally relates to an apparatus for supporting and securing electrical wire bundles, cables, hydraulic lines and the like in structures within an aircraft, and more particularly to a unitary snap-fit cable hanger.

The internal structure of an aircraft includes beams, bulkheads and other various structures that include walls. Holes are formed in such walls for reducing the weight of the aircraft, and also for the purpose of permitting electrical wire bundles, cables, hydraulic lines and the like to pass through walls.

Various types of wire routing split ring shaped devices and brackets have been developed to secure wire bundles, cables, hydraulic lines and the like to a wall and to protect such items from the edge of the hole through which such items pass.

Considerations with known wire routing apparatus include complexity, a large number of component parts, and complexity in installation.

SUMMARY OF THE INVENTION

It would therefore be an advantage to provide an easy to use cable hanger having a reduced number of parts.

Another advantage would be to provide a unitary, fully formed, one-piece cable hanger.

A further advantage would be to provide a snap-fit unitary, fully formed, one-piece cable hanger.

The foregoing and other advantages are provided by the invention in a securing apparatus that includes a tube section having a flange at one end of the cylindrical tube section, a plurality of radially extending retaining bumps disposed about the periphery of the tube section at a first predetermined axial distance from the flange, and a plurality of apertures formed in the tube section at a second predetermined axial distance from the flange, the second predetermined axial distance being greater than the first predetermined axial distance. The tube section, the flange, and the bumps are more particularly formed as a single, fully formed, one-piece structure.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic perspective view of a cable hanger in accordance with invention.

FIG. 3 is a detail view illustrating the engagement of a flange and a bump of the cable hanger of FIGS. 1 or 2 with a wall in which the cable hanger is installed.

FIG. 4 is a schematic illustration of one implementation of the bumps of the cable hangers of FIGS. 1 and 2.

FIG. 5 is a schematic illustration of another implementation of the bumps of the cable hangers of FIGS. 1 and 2.

FIG. 6 schematically illustrates the use of a pushmount type tie-wrap with the cable hangers of FIGS. 1 and 2.

DETAILED DESCRIPTION OF THE DISCLOSURE

Figure 2:
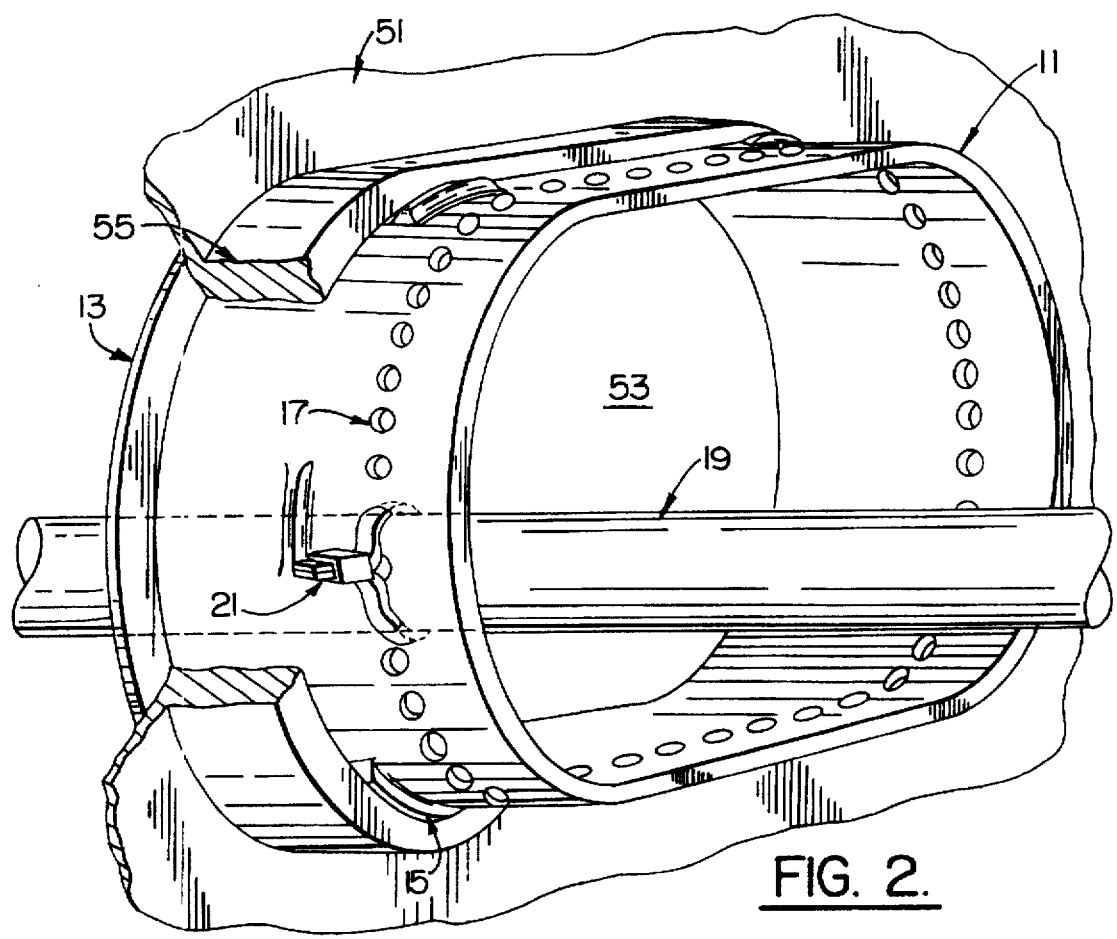
FIG. 2 is a schematic perspective view of a further cable hanger in accordance with invention.

In the following detailed description and in the several figures of the drawing, like elements are identified with like reference numerals.

Referring now to FIG. 1, set forth therein is a schematic perspective view of a cable hanger in accordance with the invention. The cable hanger is shown as being installed in a hole 53 of a wall 51 which can comprise part of a beam or a bulkhead of an aircraft, for example. A flange 55 can be formed in the wall 51 at the periphery of the hole 53.

The cable hanger includes a tube section 11 and a flange 13 disposed at one end of the tube section 11. By way of illustrative examples, the tube section can have a circular lateral cross section as illustrated in FIG. 1, or an oblong lateral cross section as illustrated in FIG. 2 in which corresponding elements have the same reference numerals as in FIG. 1. The outside of the tube section 11 is shaped and sized to suitably fit the hole 53 with which the hanger is to be utilized.

A plurality of radially extending bumps 15 are disposed on the outside of the tube section at a first predetermined axial distance from the flange 13 as measured parallel to a central axis A of the tube section. In other words, the bumps 15 are in line around the periphery of the tube section 11 and are at identical axial distances from the flange 13. The bumps 15 are appropriately axially located for the thickness of the wall 51 and any flange 55, so that the flange 13 and the bumps 15 snugly engage the wall 51 and any flange 55 when the cable hanger is installed in the hole 53, as shown in FIG. 3.

In accordance with one implementation of the invention, as illustrated in FIGS. 3 and 4, the flange 13 is orthogonal to the central axis A of the tube section 11; and each of the bumps 15 includes a sloping surface 15a that faces the non-flanged end of the tube section and a sloping surface 15b that faces the flange 13.

In accordance with another implementation of the invention, as illustrated in FIG. 5, the flange 13 is angled toward the non-flanged end of the tube section 11 such that it forms a small angle in the range of 3 to 5 degrees relative to a plane that is orthogonal to the central axis A of the tube section; and each of the bumps 15 includes a sloping surface 15a that faces the non-flanged end of the tube section and a radially extending surface 15b that faces the flange 13. The radially extending surface 15b is more particularly orthogonal to the central axis A of the tube section 11.

The cable hanger further includes a plurality of apertures 17 formed in the wall of the tube section 11 at a second predetermined axial distance from the flange 13, wherein the second predetermined axial distance is greater than the first predetermined axial distance. By way of illustrative example, the apertures 17 are distributed about the circumference of the tube section to allow for flexibility in the location of attachment of wire bundles, electrical cables, or hydraulic lines 19 as described further herein.

The tube section 11, the flange 13, and the radially extending bumps 15 preferably comprise an integral, unitary structure that is made of thermoplastic material, composite material or metal. By way of illustrative example, the radially extending bumps 15 can comprise raised portions formed in the tube section 11 or tabs having edges that are separated from the tube section 11.

By way of illustrative example, the portion of the tube section 11 between the flange 13 and the bumps 15 is of a constant size in a lateral cross section taken orthogonally to the central axis A of the tube section 11. For ease of installation, the portion of the tube section 11 between the bumps 15 and the non-flanged end of the tube section can be tapered such that the lateral cross sectional size of such portion of the tube section 11 decreases with distance from the bumps 15.

In use, the non-flanged end of the cable hanger is inserted in the hole 53 in the wall 51, and the cable hanger is pushed into the hole until the sloped faces 15a of the raised bumps 15 engage the wall adjacent the hole 53 and align the tube section 11 for final insertion. The cable hanger is then pushed into the hole 53 with sufficient force to cause the bumps 15 to deflect inwardly so that the cable hanger can be pushed further through the hole until bumps 15 snap outwardly and engage the edge of the wall flange 55. Variations of in the thickness of the wall 51 and any flange 55 are compensated by the sloping surfaces 15b of the bumps 15 of the implementation of FIG. 4, while such variations are compensated by the angled flange 13 of the implementation of FIG. 5.

Wire bundles, electrical cables, or hydraulic lines 19 are secured to the cable hanger by a strap 21 which passes through selected ones of the apertures 17. The strap 21 can comprise for example the strap of a nylon cable tie or tie-wrap as shown in FIGS. 1 and 2. Alternatively, as schematically illustrated in FIG. 6, the wire bundles, electrical cables, or hydraulic lines 19 are secured to the cable hanger by a strap 21 of a pushmount type tie-wrap that includes a self-locking pin which is pushmounted in one of the apertures 17.

The foregoing has thus been a disclosure of a single piece snap-fit cable hanger that is easy to install and maintain without tools, eliminates loose hardware, and reduces the number of parts that need to be stocked and managed.

Although the foregoing has been a description and illustration of specific embodiments of the invention, various modifications and changes thereto can be made by persons skilled in the art without departing from the scope and spirit of the invention as defined by the following claims.

What is claimed is:

1. A securing apparatus for securing cables to a wall having an aperture therein, comprising:

a plurality of straps for partially encircling cables;

a lengthwise extending tube section having a non-flanged end and a flanged end having a flange;

a plurality of radially extending retaining bumps disposed about the periphery of said tube section at a first predetermined axial distance from said flange;

said tube section, said flange, and said bumps being a single, fully formed, one-piece structure; and a plurality of apertures, defined by said tube section, each for receiving a respective one of said straps, each aperture having a diameter sized to completely surround and snugly hold said respective strap to thereby prevent movement of said respective strap and the cables partially encircled therein along a lengthwise extending portion of said tube section, said apertures being formed in said tube section at a second predetermined axial distance from said flange, said second predetermined axial distance being greater than said first predetermined axial distance.

2. The securing apparatus of claim 1 wherein said single, fully formed, one-piece structure comprised of said tube section, said flange, and said radially extending bumps comprises a plastic material.

3. The securing apparatus of claim 2 wherein each of said bumps has a first angled surface that faces the non-flanged end of said tube section and a second angled surface that faces said flange.

4. The securing apparatus of claim 2 wherein said flange is angled toward the non-flanged end of said tube section.

5. The securing apparatus of claim 1 wherein said tube section has a circular cross section.

6. The securing apparatus of claim 1 wherein said tube section has an oblong cross section.

7. The securing apparatus of claim 1 wherein each bump is positioned between at least one of the apertures and said flange such that said apertures are further removed from said flange than said bumps.

8. The securing apparatus of claim 7 wherein each bump is aligned along a lengthwise extending portion of said tube section with said at least one of the apertures.

* * * * *